United States Patent
Sano et al.

(10) Patent No.: US 12,147,032 B1
(45) Date of Patent: Nov. 19, 2024

(54) OPTICAL SCANNING APPARATUS AND IMAGE FORMING APPARATUS

(71) Applicant: CANON KABUSHIKI KAISHA, Tokyo (JP)

(72) Inventors: Atsushi Sano, Tokyo (JP); Jun Nagatoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/341,715

(22) Filed: Jun. 26, 2023

Related U.S. Application Data (62) Division of application No. 16/925,986, filed on Jul. 10, 2020, now Pat. No. 11,726,316.

(30) Foreign Application Priority Data

Jul. 31, 2019 (JP) .................. 2019-141403

(51) Int. Cl.
*G02B 26/12* (2006.01)
*G02B 26/10* (2006.01)
*G03G 15/00* (2006.01)
*G03G 15/30* (2006.01)

(52) U.S. Cl.
CPC ......... *G02B 26/122* (2013.01); *G02B 26/105* (2013.01); *G03G 15/305* (2013.01); *G03G 15/50* (2013.01)

(58) Field of Classification Search
CPC .............................. G03G 15/50; G03G 15/305
See application file for complete search history.

(56) References Cited

U.S. PATENT DOCUMENTS

| 6,813,052 | B2 | 11/2004 | Yoshizawa ................. 359/216.1 |
| 7,149,021 | B2 | 12/2006 | Yoshizawa ................. 359/216.1 |
| 7,508,859 | B2 | 3/2009 | Azami et al. ................. 372/101 |
| 9,128,291 | B2 | 9/2015 | Nagatoshi et al. .. G03G 15/043 |
| 9,581,929 | B2 | 2/2017 | Nagatoshi et al. .. G03G 15/043 |

(Continued)

FOREIGN PATENT DOCUMENTS

| JP | H11-052269 | 2/1999 |
| JP | 2003-248186 | 9/2003 |

(Continued)

OTHER PUBLICATIONS

Office Action dated Apr. 4, 2023 in counterpart Japanese Application No. 2019-141403, together with English translation thereof.

*Primary Examiner* — Walter L Lindsay, Jr.
*Assistant Examiner* — Andrew V Do
(74) *Attorney, Agent, or Firm* — Venable LLP

(57) ABSTRACT

An optical scanning apparatus includes first and second light sources, a rotatable polygonal mirror, a motor, first and second mirrors, first and second lenses, and a casing. Within a mounting range, a top wall of an accommodating portion is provided with at least one projection projecting toward an opening of the accommodating portion. The projection extends from a first side wall to a second side wall of the accommodating portion. The top wall includes a recess formed opposite from the projection, and is free from a portion projecting toward the opening over a range from the first side wall to the second side wall, other than the projection in the mounting range. A free end portion of the projection is in a position remoter from the opening than a reflecting surface of the rotatable polygonal mirror is with respect to a rotational axis direction of the motor.

5 Claims, 8 Drawing Sheets

(56) References Cited

U.S. PATENT DOCUMENTS

| | | |
|---|---|---|
| 9,854,120 B2 | 12/2017 | Tanaka et al. .......... H04N 1/113 |
| 2004/0085605 A1 | 5/2004 | Yoshizawa ................. 359/216.1 |
| 2004/0246553 A1 | 12/2004 | Yoshizawa ................. 359/216.1 |
| 2005/0243393 A1 | 11/2005 | Park ....................... G02B 7/182 |
| 2008/0063023 A1 | 3/2008 | Azami et al. ................. 372/107 |
| 2013/0215477 A1 | 8/2013 | Shibata .................... H04N 1/12 |
| 2014/0160217 A1 | 6/2014 | Nagatoshi et al. ........... 347/118 |
| 2015/0338768 A1 | 11/2015 | Nagatoshi et al. ........... 399/216 |
| 2017/0142283 A1 | 5/2017 | Tanaka et al. ..... H04N 1/00519 |
| 2018/0234575 A1 | 8/2018 | Namba et al. ......... G02B 27/09 |
| 2019/0361367 A1 | 11/2019 | Sano .................. G03G 15/0435 |
| 2020/0103784 A1 | 4/2020 | Nagatoshi ...... G03G 2215/0103 |
| 2020/0310276 A1 | 10/2020 | Katayama et al. .......................... G03G 15/04036 |

FOREIGN PATENT DOCUMENTS

| | | |
|---|---|---|
| JP | 2004-258102 | 9/2004 |
| JP | 2012-063481 | 3/2012 |
| JP | 2013-029740 | 2/2013 |
| JP | 2013-123816 | 6/2013 |
| JP | 2013-172314 | 9/2013 |
| JP | 2014-106477 | 6/2014 |
| JP | 2015-138225 | 7/2015 |
| JP | 2018-132640 | 8/2018 |

Fig.8

OPTICAL SCANNING APPARATUS AND IMAGE FORMING APPARATUS

This application is a divisional of application Ser. No. 16/925,986 filed Jul. 10, 2020, currently pending; and claims priority under 35 U.S.C. § 119 to Japan Application JP 2019-141403 filed in Japan on Jul. 31, 2019; and the contents of all of which are incorporated herein by reference as if set forth in full.

FIELD OF THE INVENTION AND RELATED ART

The present invention relates to an optical scanning apparatus suitable for an image forming apparatus, such as a copying machine or a printer, of an electrophotographic type.

In the image forming apparatus of the electrophotographic type, an electrostatic latent image is formed by irradiating a surface of a photosensitive member which is a surface-to-be-scanned, with light and is developed by depositing a developer thereon, so that an image is formed. The optical scanning apparatus includes a rotatable polygonal mirror and a scanner motor for rotationally driving the rotatable polygonal mirror and scans a surface of the photosensitive member with the light emitted from a light source and reflected and deflected by a reflecting surface of the rotatable polygonal mirror while rotating the rotatable polygonal mirror.

Here, the scanner motor generates heat by energization, and this heat is diffused inside the optical scanning apparatus by an air flow with rotation of the rotatable polygonal mirror. In the case where the thus diffused heat stagnates at a periphery of optical members such as a lens, a mounting portion on which the optical member is mounted is deformed by thermal expansion and an attitude of the optical member changes, so that there is a liability that accuracy of an irradiation position of the surface-to-be-scanned with the light deteriorates and thus an image quality deteriorates.

On the other hand, Japanese Laid-Open Patent Application (JP-A) 2003-248186 discloses a constitution in which a heat dissipation guide including an inclined surface relative to a rotational axis direction of the scanner motor is provided on a mounting surface on which the scanner motor is mounted. By this heat dissipation guide, a high-temperature air flow generated by the scanner motor as a heat source is guided to a position where the optical member is not disposed.

However, in the constitution disclosed in JP-A 2003-248186, a free end portion of the heat dissipation guide is in a position higher than the reflecting surface of the rotatable polygonal mirror. In such a constitution, in order to accommodate the heat dissipation guide, there is a need to increase a length of the scanner motor in a casing of the optical scanning apparatus with respect to a rotational axis direction, so that downsizing of the optical scanning apparatus is hindered.

SUMMARY OF THE INVENTION

The present invention has been accomplished in view of the above-described circumstances. A principal object of the present invention is to provide an optical scanning apparatus coverable of downsizing thereof while suppressing deterioration of accuracy of an irradiation position of a surface-to-be-scanned with light due to heat of a motor for rotationally driving a rotatable polygonal mirror.

According to an aspect of the present invention, there is provided an optical scanning apparatus comprising: a first light source; a second light source; a rotatable polygonal mirror configured to reflect and deflect first laser light emitted from the first light source and second laser light emitted from the second light source, the rotatable polygonal mirror reflecting the second laser light in a direction opposite to a reflection direction of the first laser light; a motor configured to rotationally drive the rotatable polygonal mirror; a first mirror configured to reflect the first laser light deflected by the rotatable polygonal mirror and configured to guide the reflected first laser light to a first surface-to-be-scanned; a second mirror configured to reflect the second laser light deflected by the rotatable polygonal mirror and configured to guide the reflected second laser light to a second surface-to-be-scanned; a first lens configured to image the first laser light deflected by the rotatable polygonal mirror on the first surface-to-be-scanned; a second lens configured to image the second laser light deflected by the rotatable polygonal mirror on the second surface-to-be-scanned; and a casing configured to accommodate the rotatable polygonal mirror, the motor, the first and second mirrors and the first and second lenses, wherein the casing includes an accommodating portion including a top wall provided with a mounting surface on which the motor is mounted, a first side wall opposing one end portion of the first lens with respect to a longitudinal direction of the first lens, a second side wall opposing the other end portion of the first lens with respect to the longitudinal direction, and an opening, and includes a cover portion configured to cover the opening, of the accommodating portion, provided at a position opposing the mounting surface, wherein of the top wall of the accommodating portion, within a mounting range in which the motor, the first and second mirrors and the first and second lenses are mounted with respect to a perpendicular direction perpendicular to both a rotational axis direction of the motor and the longitudinal direction of the first lens, at least one projection having a shape such that a part of the top wall projects so that the mounting surface approaches the opening is provided, wherein the projection extends from the first side wall to the second side wall, wherein the top wall includes a recess on a surface opposite from the mounting surface at a portion corresponding to the projection, wherein the top wall is free from a portion, other than the projection in the mounting range, projecting toward the opening over a range from the first side wall to the second side wall, and wherein a free end portion of the projection on an opening side is in a position remoter from the opening than a reflecting surface of the rotatable polygonal mirror is with respect to the rotational axis direction.

Further features of the present invention will become apparent from the following description of exemplary embodiments with reference to the attached drawings.

BRIEF DESCRIPTION OF THE DRAWINGS

Parts (a) and (b) of FIG. 8 are schematic views showing a result of an experiment for verifying a temperature change of an inside of each of the optical box according to the comparison example and the optical box according to an embodiment of the present invention, respectively, with heat generation of an associated scanner motor.

DESCRIPTION OF EMBODIMENTS

<Image Forming Apparatus>

A general structure of an image forming apparatus including an optical scanning apparatus according to an embodiment of the present invention will be described with reference to the drawing together with an operation of the image forming apparatus during image formation. In the following description, as regards dimensions, materials, shapes and relative arrangement of constituent elements (component parts), the scope of the present invention is not intended to be limited to those described below unless otherwise specified.

An image forming apparatus A according to this embodiment is an image forming apparatus of an intermediary transfer tandem type in which toner images of four colors of yellow Y, magenta M, cyan C and black K are transferred onto an intermediary transfer belt and then are transferred onto a sheet and thus a color image is formed on the sheet. In the following description, although members associated with the respective colors are represented by adding Y, M, C and K as suffixes to reference numerals or symbols, structures and operations of the respective members are substantially the same except that the colors of toners used are different from each other, and therefore the suffixes will be appropriately omitted except for the case requiring distinction.

Figure 1:
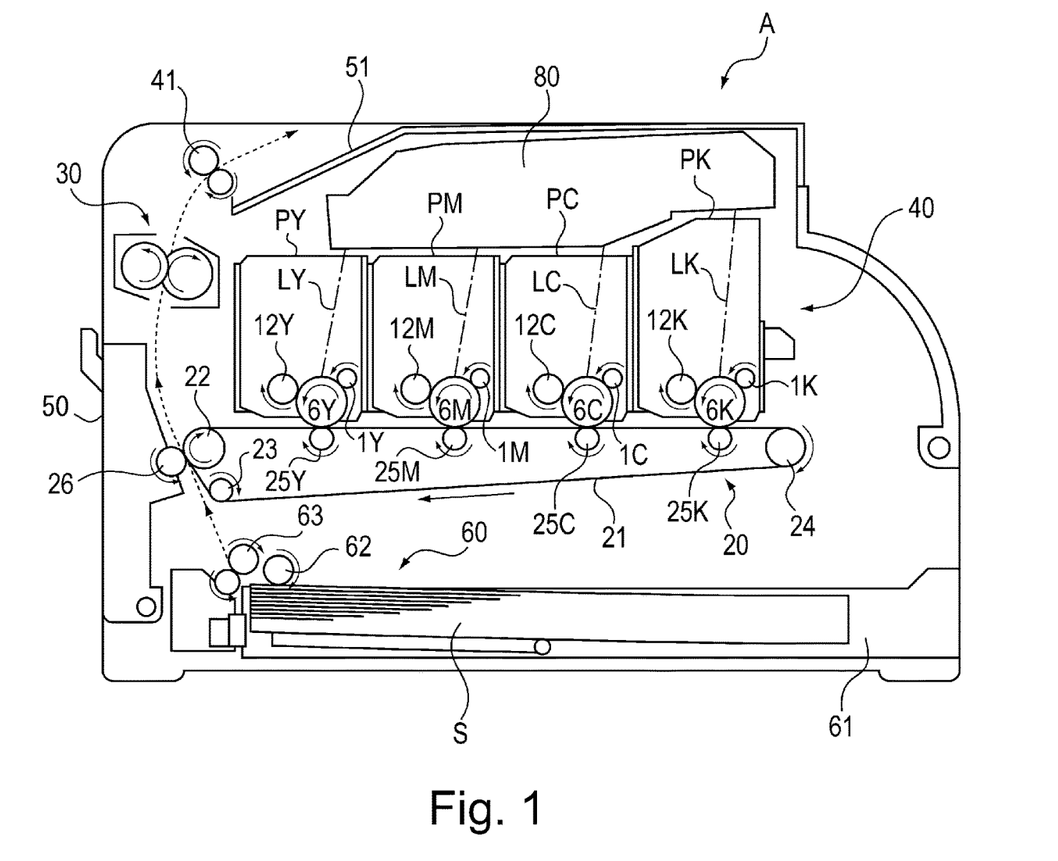
FIG. 1 is a schematic view of an image forming apparatus.

FIG. 1 is a schematic sectional view of the image forming apparatus A. As shown in FIG. 1, the image forming apparatus A includes an image forming portion 40 for forming and transferring the toner images onto the sheet, a sheet feeding portion 60 for feeding (supplying) the sheet toward the image forming portion 40, and a fixing portion 30 for fixing the toner images on the sheet.

The image forming portion 40 includes process cartridges P (PY, PM, PC, PK), an optical scanning apparatus 80, and an intermediary transfer unit 20. The intermediary transfer unit 20 includes primary transfer rollers 25 (25Y, 25M, 25C, 25K), an intermediary transfer belt 21, a secondary transfer roller 26, a secondary transfer opposite roller 22, a tension roller 23 and a follower roller 24. The intermediary transfer belt 21 is stretched by the secondary transfer opposite roller 22, the tension roller 23 and the follower roller 24, and the secondary transfer opposite roller 22 is rotated by a driving force of an unshown motor, so that the intermediary transfer belt 21 is circulated and moved by the rotation of the secondary transfer opposite roller 22.

The process cartridges PY, PM, PC and PK are constituted so as to be mountable in and dismountable from an apparatus main assembly 50 of the image forming apparatus A and are disposed in parallel in the substantially horizontal direction. The respective process cartridges P include photosensitive drums 6 (6Y, 6M, 6C, 6K), charging rollers (1Y, 1M, 1C, 1K), and developing rollers 12 (12Y, 12M, 12C, 12K). Here, the process cartridge PK are configured to have a volume larger than volumes of other process cartridges. This is because the black toner is higher in use frequency than other color toners and therefore an accommodating space for the black toner is made larger than those for the other color toners.

Next, an image forming operation of an image forming apparatus A will be described. First, when an image forming job is inputted to an unshown controller, a sheet S stacked and accommodated in a sheet cassette 61 is sent by a feeding roller 62 and a conveying roller pair 63 to a secondary transfer portion formed by the secondary transfer roller 26 and the secondary transfer opposite roller 22.

On the other hand, in the image forming portion 40, first, the surface of the photosensitive drum 6Y is electrically charged by the charging roller 1Y. Thereafter, the surface of the photosensitive drum 6Y is irradiated with laser light LY by the optical scanning apparatus 80 depending on an image signal sent from an unshown external device or the like, so that an electrostatic latent image is formed on the surface of the photosensitive drum 6Y.

Thereafter, the yellow toner is deposited by the developing roller 12Y on the electrostatic latent image formed on the surface of the photosensitive drum 6Y, so that a yellow toner image is formed on the surface of the photosensitive drum 6Y. The yellow toner image formed on the surface of the photosensitive drum 6Y is primary-transferred onto the intermediary transfer belt 21 under application of a bias to the primary transfer roller 25Y.

By similar processes, the surfaces of the photosensitive drums 6M, 6C and 6K are also irradiated with beams of laser light LM, LC and LK, depending on image signals, emitted from the optical scanning apparatus 80, so that magenta, cyan and black toner images are formed, respectively. Then, by applying primary transfer biases to the primary transfer rollers 25M, 25C and 25K, these toner images are transferred superposedly onto the yellow toner image on the intermediary transfer belt 21. By this, a full-color toner image is formed on the surface of the intermediary transfer belt 21.

Thereafter, the intermediary transfer belt 21 is circulated and moved, so that the full-color toner image is sent to the secondary transfer portion. Then, at the secondary transfer portion, by applying a secondary transfer bias to the secondary transfer roller 26, so that the full-color toner image is secondary-transferred from the intermediary transfer belt 21 onto the sheet S. Then, the sheet S on which the toner images are transferred is subjected to heating and pressing processes in a fixing portion 30, whereby the toner images on the sheet S are fixed on the sheet S. Thereafter, the sheet S on which the toner images are fixed is discharged onto a discharge tray 51 by a discharging roller pair 41.

<Optical Scanning Apparatus>

Next, a structure of the optical scanning apparatus 80 will be described.

Figure 2:
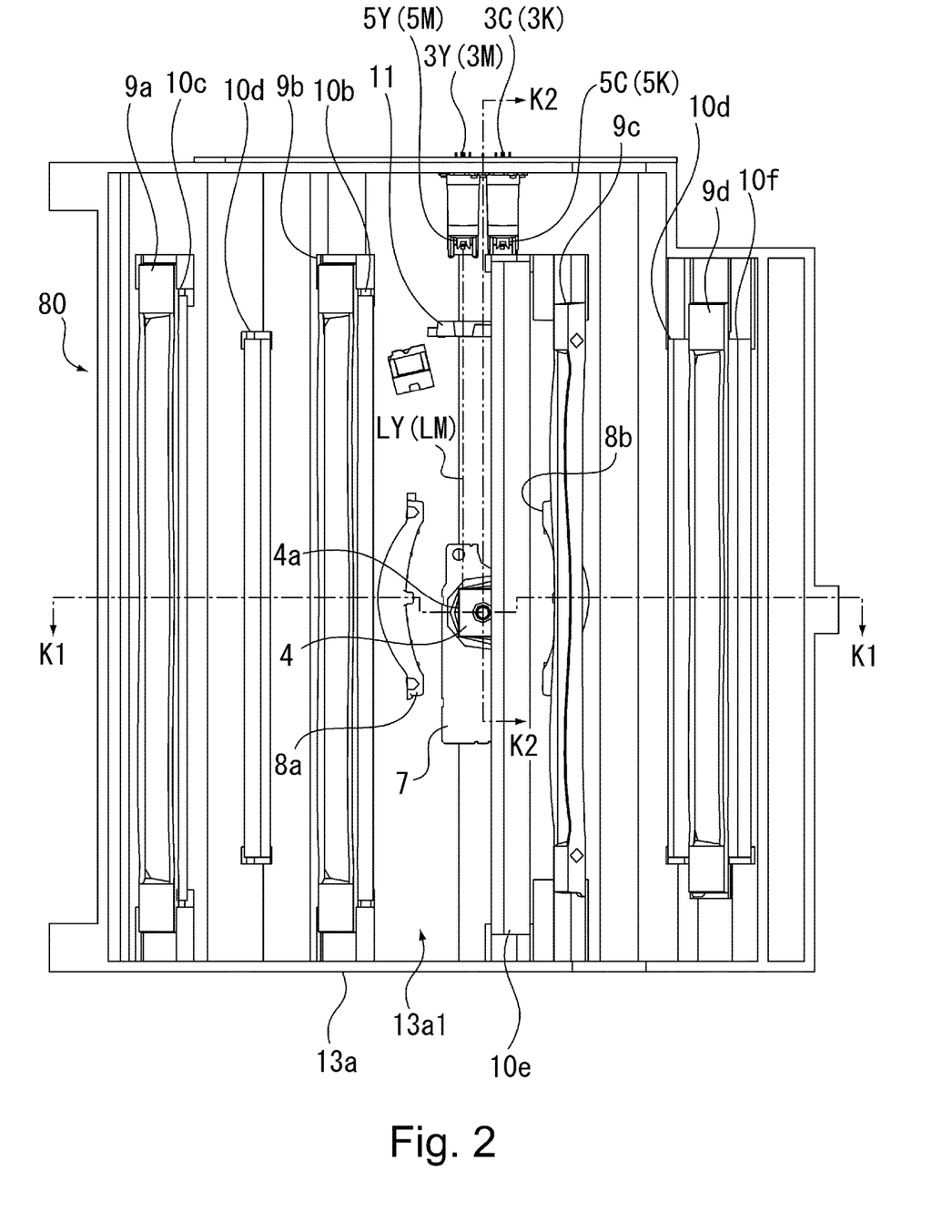
FIG. 2 is a top plan view of an optical scanning apparatus.
Figure 3:
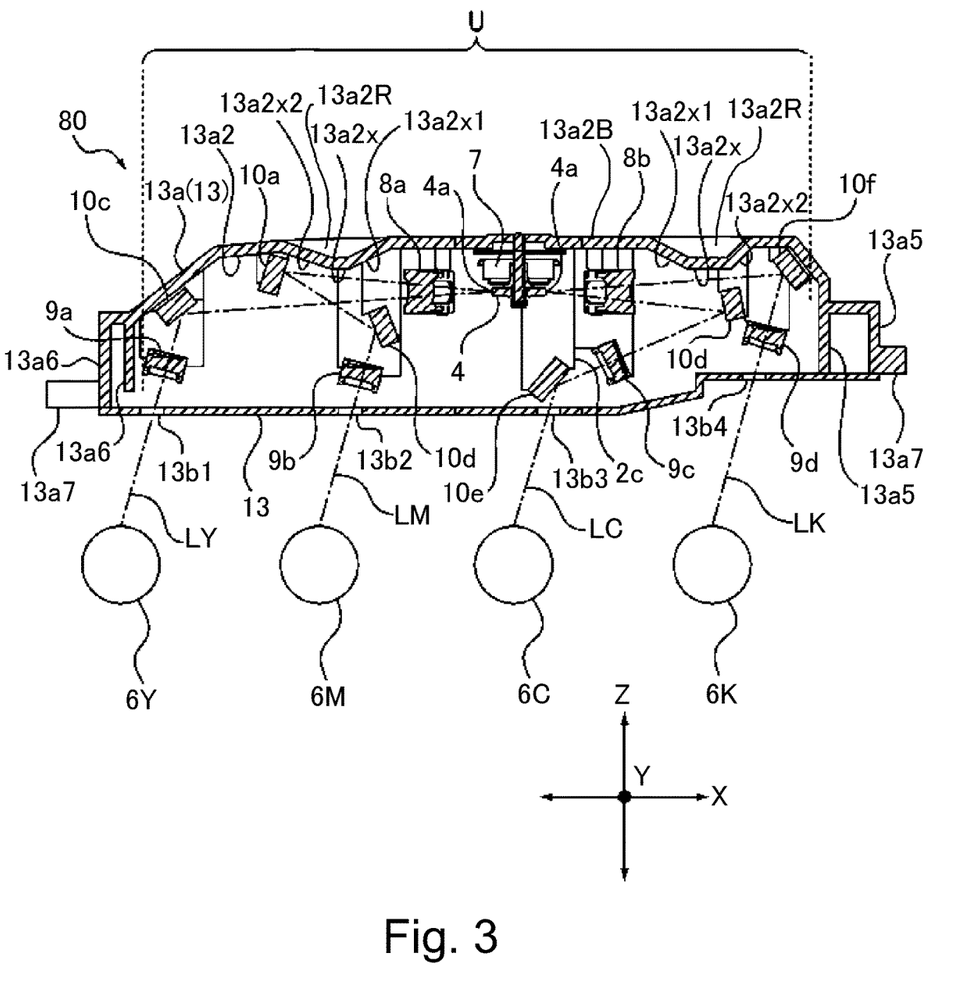
FIG. 3 is a sectional view of the optical scanning apparatus.
Figure 4:
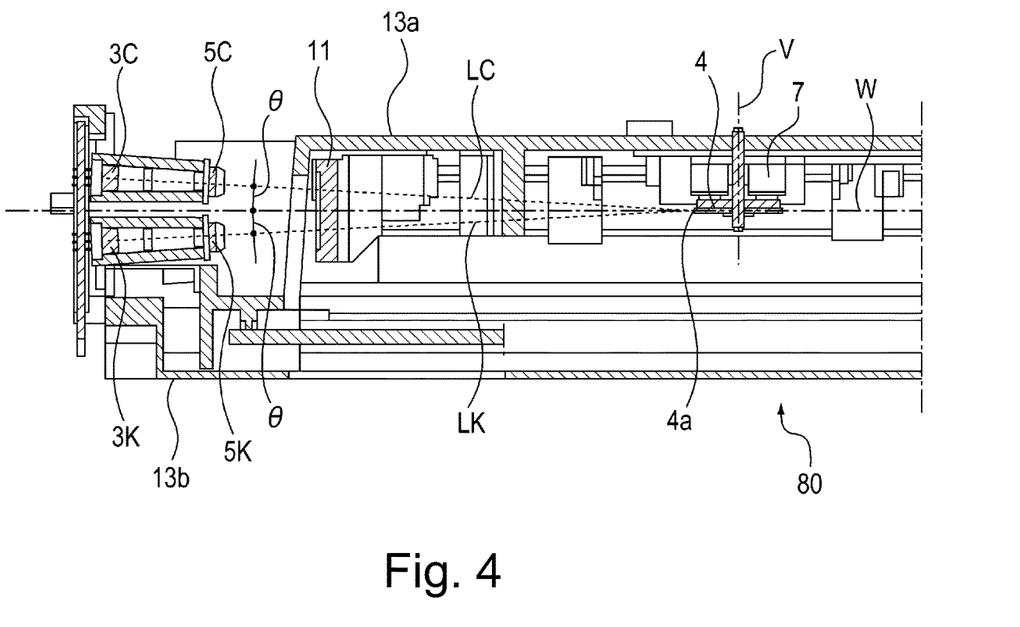
FIG. 4 is a sectional view of the optical scanning apparatus.

FIG. 2 is a top plan view of the optical scanning apparatus 80 as seen from the photosensitive drum 6 side. In FIG. 2, a state in which a cover portion 13b of a casing 13 of the optical scanning apparatus 80 is removed. FIG. 3 is a sectional view of the optical scanning apparatus 80 cut along a K1-K1 cross-section shown in FIG. 2. FIG. 4 is a sectional view of the optical scanning apparatus 80 cut along a K2-K2 cross-section shown in FIG. 2.

As shown in FIGS. 2, 3 and 4, the optical scanning apparatus 80 includes light sources 3 (3Y, 3M, 3C, 3K), collimator lens 5 (5Y, 5M, 5C, 5K) and a cylindrical lens 11. Further, the optical scanning apparatus 80 includes a rotatable polygonal mirror 4 including a plurality of reflecting surfaces for reflecting the laser light L emitted from the light source 3 and includes a scanner motor 7 for rotationally driving the rotatable polygonal mirror 4. Further, the optical scanning apparatus 80 includes first imaging lens 8 (8a, 8b) and second imaging lens 9 (9a, 9b, 9c, 9d) for imaging beams of lens deflected by the rotatable polygonal mirror 4 on surfaces-to-be-scanned (surface of the photosensitive drums 6) and includes mirrors 10 (10a-10f) for reflecting the lens deflected by the rotatable polygonal mirror 4 and for guiding the reflected lens to the surfaces-to-be-scanned.

Here, in this embodiment, the light sources 3C and 3K are disposed adjacent to each other at different positions with respect to a sub-scan direction. As shown in FIG. 4, beams of laser light LC and LK emitted from the light sources LC and LK are obliquely incident on the same reflecting surface 4a with an angle θ relative to a sub-scan cross-section W perpendicular to a rotational axis V of the scanner motor 7. The light sources 3Y, 3M have the same constitution. By such constitutions, it is possible to realize downsizing of the optical scanning apparatus 80.

The above-described optical members are accommodated in a box-shaped casing 13. The casing 13 is made of a resin material such as polycarbonate as a material from viewpoints of mass-productivity and a degree of freedom of a shape. The casing 13 is provided with an opening 13a1 and is constituted by an optical box (accommodating portion) 13a in which the above-described optical members are mounted and accommodated and by a cover portion 13b defining the opening 13a1 of the optical box 13a. The cover portion 13b is provided with through holes 13b1-13b4 for permitting passing of the laser light L emitted from the light source 3.

Next, a basic operation of the optical scanning apparatus 80 will be described. First, the laser light L emitted from the light source 3 is converted into a laser light flux collimated by the collimator lens 5. Thereafter, the laser light L passes through the cylindrical lens 11 and converges only in the sub-scan direction and images as a line image on a reflecting surface 4a of the rotatable polygonal mirror 4.

Each laser light L imaged on the reflecting surface 4a of the rotatable polygonal mirror 4 is reflected and deflected by the reflecting surface 4a by rotating the rotatable polygonal mirror 4 by a driving force of the scanner motor 7. As regards the laser light LY, the laser light LY passes through the first imaging lens 8a and then is reflected by the mirror 10c. Then, the laser light LY passes through the second imaging lens 9a and then passes through the through hole 13b1 of the cover portion 13b, and thereafter the laser light LY is imaged on the surface (surface-to-be-scanned) of the photosensitive drum 6Y (photosensitive member).

As regards the laser light LM, the laser light LM passes through the first imaging lens 8a and then is reflected by the mirrors 10a and 10b. Then, the laser light LM passes through the second imaging lens 9b and then passes through the through hole 13b2 of the cover portion 13b, and thereafter the laser light LM is imaged on the photosensitive drum 6M. Further, as regards the laser light LC, passes through the first imaging lens 8a and then is reflected by the mirror 10d. Then, the laser light LC passes through the second imaging lens 9c and reflected by the mirror 10e and then passes through the through hole 13b3 of the cover portion 13b, and thereafter the laser light LC is imaged on the photosensitive drum 6C. Further, as regards the laser light LK, passes through the first imaging lens 8a and then is reflected by the mirror 10f. Then, the laser light LK passes through the second imaging lens 9d and then passes through the through hole 13b4 of the cover portion 13b, and thereafter the laser light LK is imaged on the photosensitive drum 6K.

Thus, each of the surfaces of the photosensitive drums 6 is scanned with the associated laser light L by the optical scanning apparatus 80, so that the electrostatic latent image is formed on the photosensitive drum surface. Specifically, the photosensitive drum surface is scanned in a main scan direction with a spot image imaged by the laser light L by changing an angle of deflection of the laser light L through rotation of the rotatable polygonal mirror 4. Further, the photosensitive drum surface is scanned in the sub-scan direction with a spot image imaged by the laser light L through rotation of the rotatable polygonal mirror 4.

Incidentally, in this embodiment, the light source 3Y emitting the laser light LY (first laser light) corresponds to a first light source, and the light source 3K emitting the laser light LK (second laser light) corresponds to a second light source. The rotatable polygonal mirror 4 reflects the second laser light LK in a direction opposite to a reflection direction of the first laser light LY. Further, the mirror 10c corresponds to a first mirror for guiding the first laser light LY to a first surface-to-be-scanned (the surface of the photosensitive drum 6Y), and the mirror 10f corresponds to a second mirror for guiding the second laser light LK to a second surface-to-be-scanned (the surface of the photosensitive drum 6K). Further, the lens 9a corresponds to a first lens, and the lens 9d corresponds to a second lens.

<Optical Box>

Next, a structure of the optical box 13 of the optical scanning apparatus 80 will be specifically described.

As described above, the scanner motor 7 generates heat by energization, and this heat is diffused inside the casing 13 by an air flow with rotation of the rotatable polygonal mirror 4. In the case where the thus formed high-temperature air flow stagnates in the casing 13, the casing is locally increased in temperature, so that the casing 13 is deformed due to thermal expansion. When a mounting portion of the casing 13 is deformed, an attitude of the above-described optical member changes, so that accuracy of an irradiation position of the surface of the photosensitive drum 6 which is the surface-to-be-scanned, with the laser light L deteriorates. Therefore, in this embodiment, the optical box 13a is constituted in the following manner, so that deterioration of the accuracy of the irradiation position of the surface of the photosensitive drum 6 with the laser light, caused due to the heat of the scanner motor 7 is suppressed.

Figure 5:
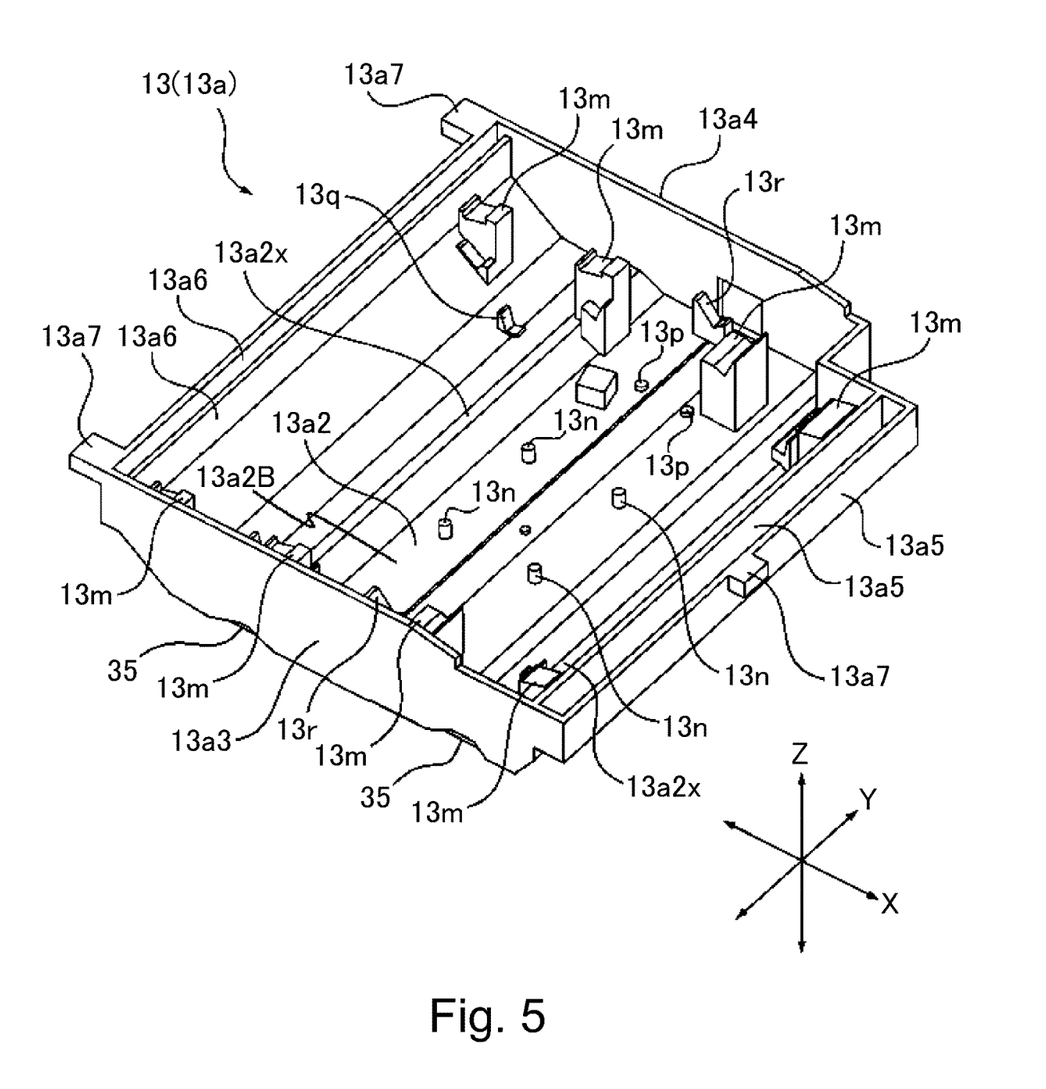
FIG. 5 is a perspective view showing an inside structure of an optical box.
Figure 6:
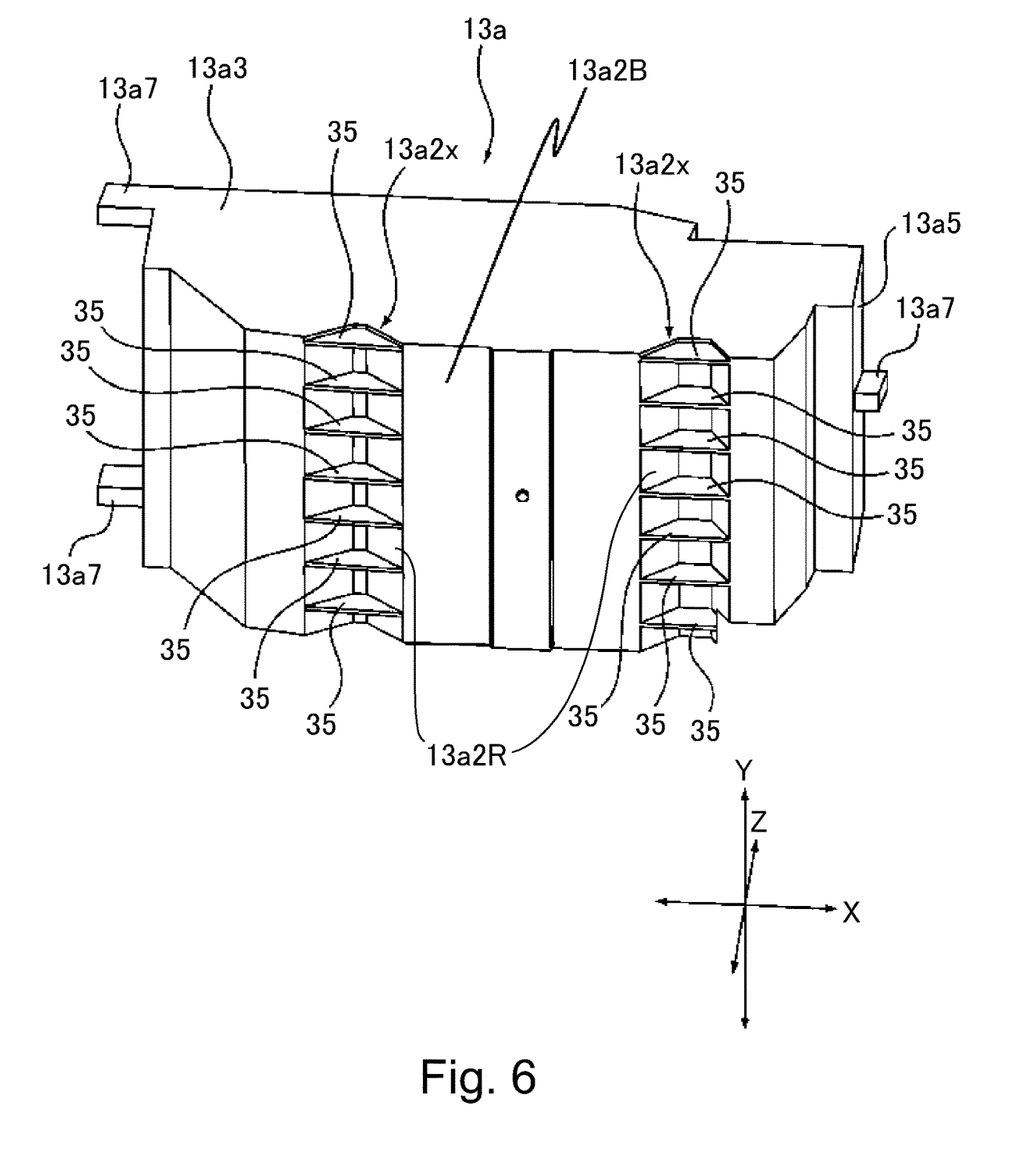
FIG. 6 is a perspective view of the optical box as seen from an outside of the optical box.

FIG. 5 is a perspective view showing an inside structure of the optical box (accommodating portion) 13a. FIG. 6 is a perspective view of the optical box 13, of which a top surface is seen from an outside of the optical box 13. As shown in FIG. 5, the optical box 13 includes a top wall 13a2B which includes a mounting surface 13a2, which is a top inner surface of the optical box 13, on which the scanner motor 7 is to be mounted, and includes side walls 13a3 to 13a6. The side walls 13a3 (first side wall) and 13a4 (second side wall) oppose each other, and the side walls 13a5 and 13a6 oppose each other. Each of the side walls 13a5 and 13a6 which are a part of the side walls has a double wall structure in order to improve strength of the optical box 13a. Incidentally, a constitution in which each of the side walls 13a3 and 13a4 has the double wall structure or a constitution in which all the side walls have the double wall structure may also be employed. Further, the optical box 13a includes three fixation portions 13a7 to be fixed to an unshown frame of the apparatus main assembly 50 of the image forming apparatus A.

The optical box 13a includes lens mounting portions 13n on which the first imaging lens 8a and 8b are mounted by an ultraviolet curable adhesive and includes lens mounting portions 13*m* on which the second imaging lens 9*a* to 9*d* are mounted by the ultraviolet curable adhesive. Further, the optical box 13*a* includes lens mounting portions 13*p* on which the cylindrical lens 11 is mounted by the ultraviolet curable adhesive. Further, the optical box 13*a* includes a mirror mounting portion 13*q* on which the mirror 10*a* is mounted through an unshown leaf spring and includes a mirror mounting portion 13*r* on which the mirror 10*e* is mounted through the leaf spring. The above-described mounting portions for mounting the above-described optical members are integrally formed with the optical box 13*a*.

Here, a rotational axis direction of the scanner motor 7 is an arrow Z direction, a longitudinal direction of the first imaging lens 8 (=a light source of the first lens 8*a*) is an arrow Y direction, and a direction perpendicular to the arrow Z direction and the arrow A direction is an arrow X direction. The arrow Z direction is a vertical direction, and the arrow Y direction and the X direction are a horizontal direction. Of the top wall 13*a*2*b* of the optical box 13*a*, with respect to the direction X perpendicular to both the rotational axis direction Z of the scanner motor 7 and the longitudinal direction of the first lens 9*a*, a range in which the scanner motor 7, the first and second mirrors 10*c* and 10*f* and the first and second lens 9*a* and 9*b* are mounted is referred to as a mounting range U (FIG. 3). In this case, in the mounting range U, except for a projection 13*a*2*x* described later, another projecting portion such as a rib or the like which projects in the arrow Z direction toward an inside of the optical box 13*a* and which is formed so as to range between the side walls 13*a*3 and 13*a*4 is not provided (see also FIG. 3).

Thus, there is no rib formed so as to range between the side walls 13*a*3 and 13*a*4 in the range U of the optical box 13*a*, and the scanner motor 7 is a heat source and a high-temperature air flow generated with rotation of the rotatable polygonal mirror 4 is not blocked, so that the high-temperature air flow is liable to diffuse to entirety of the optical box 13*a*. Accordingly, it is possible to suppress deformation of the optical box 13*a* with local temperature rise, and a change in attitude of the above-described optical images mounted in the optical box 13*a*, so that deterioration of accuracy of the irradiation position of the photosensitive drum 6 with the laser light L can be suppressed. Further, the deterioration of the accuracy of the irradiation position of the photosensitive drum 6 with the laser light L is suppressed, and therefore, it is possible to suppress color misregistration when the toner images of the respective colors are superposed.

Further, the optical box 13*a* is not provided with the rib formed so as to range between the above-described side walls 13*a*3 and 13*a*4, and therefore, instead of the rib, it is desirable that a constitution for reinforcing the optical box 13*a* is provided. In the case where the strength of the optical box 13*a* is weak, vibration of the optical box 13*a* during the rotation of the scanner motor 7 becomes large, so that the accuracy of the irradiation position of the photosensitive drum 6 with the laser light L deteriorates.

Therefore, as shown in FIGS. 3 and 5, in order to improve the strength of the optical box 13*a*, in the range U on the mounting surface 13*a*2 of the optical box 13*b*, the projection 13*a*2*x* projecting in the arrow Z direction which is the rotational axis direction of the scanner motor 7, toward the inside of the optical box 13*a*. The projection 13*a*2*x* is disposed at a position remoter from the scanner motor 7 with respect to the arrow X direction than the first imaging lens 8 is, and is formed so as to range between the side walls 13*a*3 and 13*a*4, of the optical box 13*a*, which oppose each other. Thus, the top wall 13*b*2B of the optical box 13*a* is provided with at least one projection 13*a*2*x* having a shape such that a part of the top wall 13*a*2B expands so that the mounting surface 13*a*2 approaches the opening 13*a*1. The projection 13*a*2*x* extends from the first side wall 13*a*3 to the second side wall 13*a*4. In the mounting range U, except for the projection 13*a*2*x*, the top wall 13*a*2B is not provided with a portion projecting toward the opening 13*a*1 over a range from the first side wall 13*a*3 to the second side wall 13*a*4. Further, a free end portion of the projection 13*a*2*x* on the opening 13*a*1 side is in a position remoter from the opening 13*a*1 with respect to the rotational axis direction Z than the reflecting surface of the rotatable polygonal mirror 4 is.

Further, when the projection 13*a*2*x* is seen in the arrow Y direction, the projection 13*a*2*x* includes inclined surfaces 13*a*2*x*1 and 13*a*2*x*2 each inclined so as to approach the opening 13*a*1 from a base end portion toward a free end portion of the projection 13*a*2*x* (FIG. 3). Thus, by providing the inclined surfaces 13*a*2*x*1 and 13*a*2*x*2, the high-temperature air flow from the scanner motor 7 as the heat source easily flows through the projection 13*a*2*x* when passes through the projection 13*a*2*x*. Accordingly, the high-temperature air flow becomes easy to diffuse. In this embodiment, although the constitution in which the projection 13*a*2*x* includes the two inclined surfaces 13*a*2*x*1 and 13*a*2*x*2 was described, an effect similar to the above-described effect can be obtained by including at least the inclined surface 13*a*2*x*1 close to the scanner motor 7 in the arrow X direction.

Further, the free end portion of the projection 13*a*2*x* is in the position remoter from the opening 13*a*1 in the arrow Z direction than the reflecting surface of the rotatable polygonal mirror 4 is. By setting a projection amount of such a projection 13*a*2*x*, an increase in length of the optical box 13*a* with respect to the arrow E direction is suppressed by the influence of the projection 13*a*2*x*, and therefore, it is possible to downsize the optical scanning apparatus 80.

Further, as shown in FIG. 6, at a portion corresponding to the projection 13*a*2*x* of the top wall 13*a*2B, a back surface positioned opposite from the mounting surface 13*a*2 constitutes a recess 13*a*2R. The recess 13*a*2R is provided with a plurality of ribs 35 each extending in the arrow X direction. Thus, by disposing the ribs 35 on the back surface of the projection 13*a*2*x* as described above, it is possible to not only improve the strength of the optical box 13*a* but also prevent blocking of the high-temperature air flow from the scanner motor 7 by the ribs 35. Different from this embodiment, a constitution in which the ribs 35 are provided on the projection 13*a*2*x* may also be employed. This is because the ribs 35 extending in the arrow X direction and therefore even the ribs are disposed inside the optical box 13*a*, the ribs do not readily block the air flow and thus do not remarkably impair an air flow diffusing effect. In the case where the ribs 35 are provided on the projection 13*a*2*x*, in order to prevent upsizing of the optical box 13*a* by the presence of the ribs 35, the free end portions of the ribs are disposed at positions remoter from the opening 13*a*1 with respect to the arrow Z direction than the reflecting surface 4*a* of the rotatable polygonal mirror 4 is.

Thus, according to the constitution of this embodiment, in the range U of the optical box 13*a*, another projection such as the rib formed so as to range between the side walls 13*a*3 and 13*a*4 is not provided, so that the high-temperature air flow from the scanner motor 7 as the heat source can be efficiently diffused inside the optical box 13*a*. Accordingly, deformation with local temperature rise of the optical box 13*a* is suppressed, so that deterioration of accuracy of the irradiation position of the surface of the photosensitive drum 6 with the laser light L, due to the heat of the scanner motor 7 can be suppressed. Further, by forming the projection 13a2x on the mounting surface 13a2 of the optical box 13a, not only the strength of the optical box 13a is improved, but also an increase in length of the casing 13 with respect to the arrow Z direction can be suppressed by the projection 13a2x, so that downsizing of the optical scanning apparatus 80 can be realized.

<Experiment Result>

Next, a result of an experiment in which a temperature change of the inside of the optical box 13a with heat generation of the scanner motor 7 in each of the optical scanning apparatus 80 according to this embodiment and an optical scanning apparatus 180 according to a comparison example is verified will be described.

Figure 7:
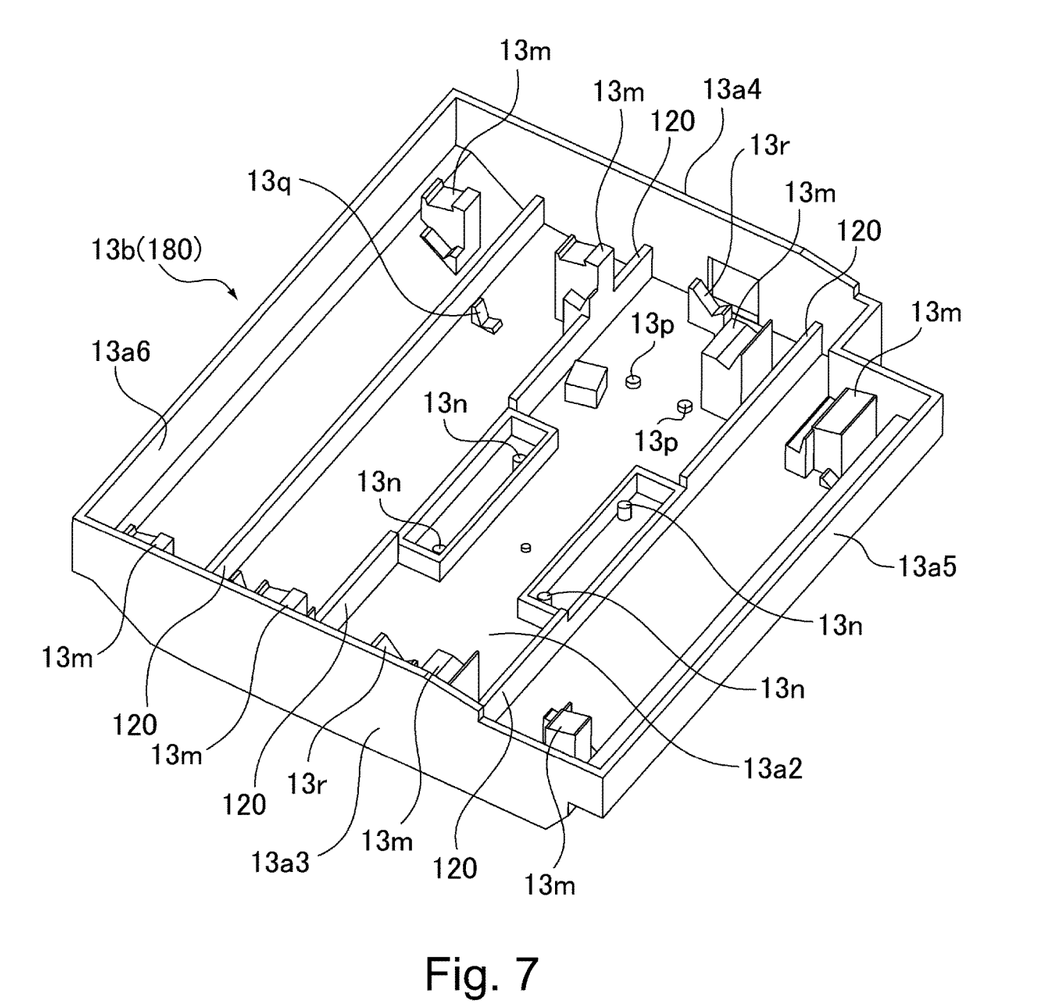
FIG. 7 is a perspective view of an optical box according to a comparison example.

The optical scanning apparatus 80 according to this embodiment and the optical scanning apparatus 180 according to the comparison example are only different in shape of the optical box 13a. FIG. 7 is a perspective view of the optical scanning apparatus 180 according to the comparison example. As shown in FIG. 7, the optical box 13a of the optical scanning apparatus 180 according to the comparison example is provided with a plurality of ribs 120, which are portions disposed so as to range between the side walls 13a1 and 13a4, at positions in a range corresponding to the mounting range U shown in FIG. 3. Further, the optical box 13a of the optical scanning apparatus 180 according to the comparison example is reinforced by the ribs, and therefore, the projection 13a2x is not formed, and the side walls 13a5 and 13a6 do not have the double wall structure. Other constitutions are roughly similar to those of this embodiment.

Figure 8:
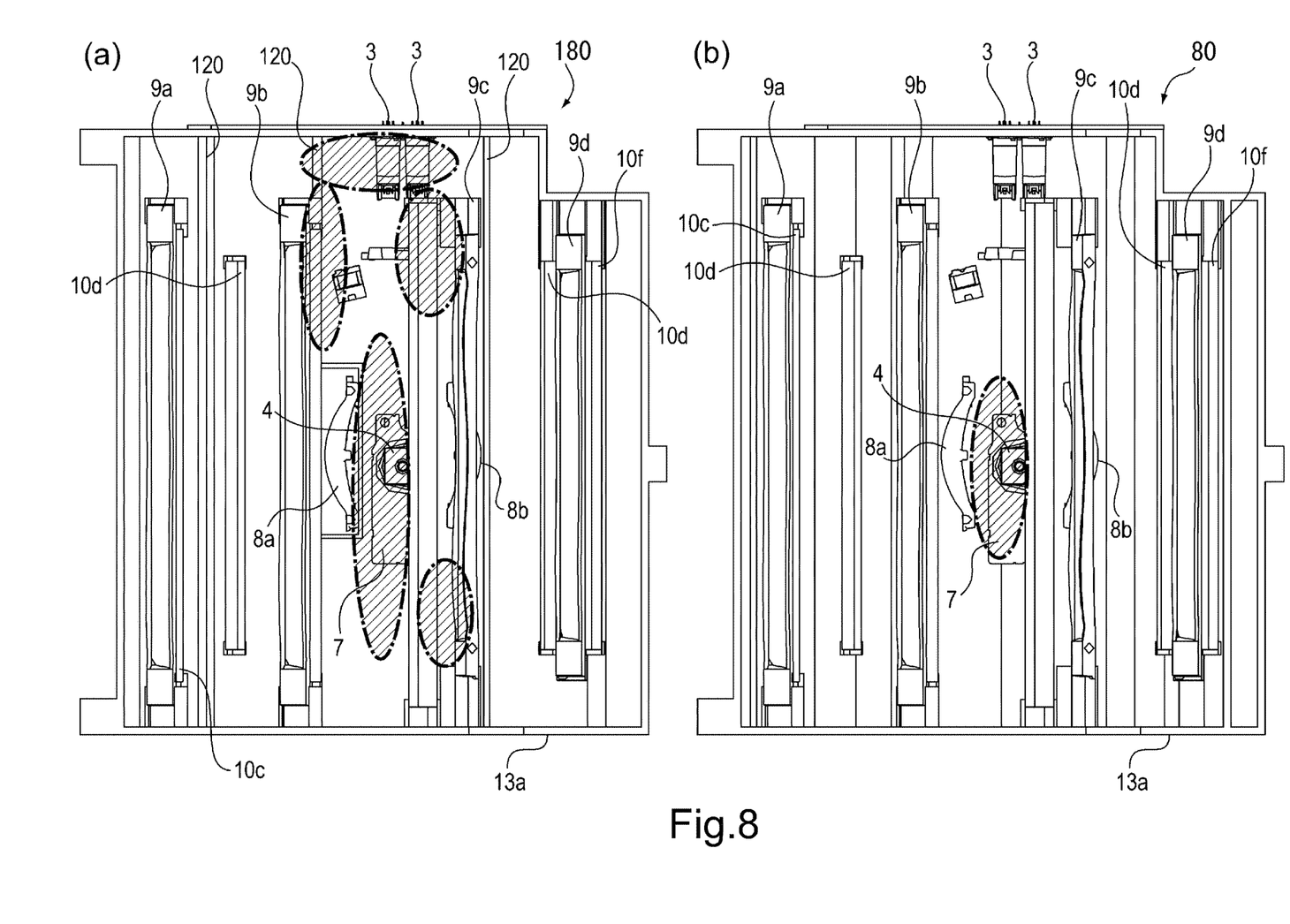

Parts (a) and (b) of FIG. 8 are schematic views showing the result of the experiment. In parts (a) and (b) of FIG. 8, portions enclosed by chain lines are portions where an inside temperature of the optical box 13a is increased largely compared with other portions. As shown in part (a) of FIG. 8, in the optical scanning apparatus 180 according to the comparison example, temperature rise at a periphery of the ribs 120 becomes conspicuous. This would be considered that the high-temperature air flow generated, with rotation of the rotatable polygonal mirror 4, from the scanner motor 7 as the heat source is blocked by the ribs 120 and thus stagnates at the periphery of the ribs 120. On the other hand, as shown in part (b) of FIG. 8, in the optical scanning apparatus 80 of this embodiment, there is no member corresponding to the ribs 120 in the optical scanning apparatus 180 of the comparison example, and therefore, although the temperature rise at the periphery of the scanner motor 7 is large, local temperature rise at other portions is not observed. Thus, according to this embodiment, it was confirmed by this experiment that the local temperature rise of the optical box 13a can be suppressed.

Incidentally, in this embodiment, the constitution in which the two projections 13a2x were formed in the range U in the optical box 13a was described. However, the present invention is not limited thereto, but the number of the projections 13a2x may also be appropriately changed depending on the strength required for the optical box 13a.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In the foregoing, the embodiments have been described with the polygonal mirror suspended from the top wall. However, the polygonal mirror may be supported on a bottom wall, that is, the structures described may be reversed upside down, within the spirit of the present invention. For such a case, the top wall reads the bottom wall, and the cover reads the top cover.

This application claims the benefit of Japanese Patent Application No. 2019-141403 filed on Jul. 31, 2019, which is hereby incorporated by reference herein in its entirety.

What is claimed is:

1. An optical scanning apparatus comprising:
a first light source;
a second light source;
a rotatable polygonal mirror configured to reflect and deflect first laser light emitted from said first light source and second laser light emitted from said second light source, said rotatable polygonal mirror reflecting the second laser light in a direction opposite to a reflection direction of the first laser light;
a motor configured to rotationally drive said rotatable polygonal mirror;
a first mirror configured to reflect the first laser light deflected by said rotatable polygonal mirror and configured to guide the reflected first laser light to a first surface-to-be-scanned;
a second mirror configured to reflect the second laser light deflected by said rotatable polygonal mirror and configured to guide the reflected second laser light to a second surface-to-be-scanned;
a first lens configured to image the first laser light deflected by said rotatable polygonal mirror on said first surface-to-be-scanned;
a second lens configured to image the second laser light deflected by said rotatable polygonal mirror on said second surface-to-be-scanned; and
a casing accommodating said rotatable polygonal mirror, said motor, said first and second mirrors and said first and second lenses, wherein said casing includes an accommodating portion including a top wall provided with a mounting surface on which said motor is mounted, a first side wall opposing one end portion of said first lens with respect to a longitudinal direction of said first lens, a second side wall opposing the other end portion of said first lens with respect to the longitudinal direction, and an opening, and includes a cover portion configured to cover said opening, of said accommodating portion, provided at a position opposing said mounting surface,
wherein in a mounting range of said top wall of said accommodating portion in which said motor, said first and second mirrors and said first and second lenses are mounted with respect to a perpendicular direction perpendicular to both a rotational axis direction of said motor and the longitudinal direction of said first lens, at least one curved portion having a shape such that a part of said top wall projects so that said mounting surface approaches said opening is provided,
wherein with respect to the longitudinal direction of said first lens, said curved portion has a length equal to a gap between said first side wall and said second side wall,
wherein said top wall includes a recess on a surface opposite from said mounting surface at a portion corresponding to said curved portion,
wherein said cover includes a first portion through which the first laser light passes and a second portion through which the second laser light passes, and
wherein with respect to the rotational axis direction, a top end portion of said curved portion on an opening side of said casing, a reflecting surface of said rotatable polygonal mirror, and the first and second portions of said cover, are arranged in this order.

2. An optical scanning apparatus according to claim 1, further comprising a third light source emitting third laser light reflected by the rotatable polygonal mirror and a fourth light source emitting fourth laser light reflected by the rotatable polygonal mirror,
wherein of the first to fourth laser lights, the first laser light and the second laser light are beams of laser light emitted from said optical scanning apparatus at positions farthest from the rotational polygonal mirror with respect to the direction perpendicular to the rotational axis direction and the longitudinal direction.

3. An optical scanning apparatus according to claim 1, wherein said recess is provided with a plurality of ribs each emitting in the perpendicular direction.

4. An optical scanning apparatus according to claim 1, wherein at least a part of said first and second side walls has a double wall structure.

5. An image forming apparatus for forming an image on a sheet, comprising:
a first photosensitive member;
a second photosensitive member;
an optical scanning unit configured to scan said first photosensitive member and said second photosensitive member with first laser light and second laser light, respectively, depending on image information;
first and second developing units configured to position electrostatic latent images, formed on said first and second photosensitive members by said optical scanning unit, with toner; and
a transfer unit configured to transfer first and second toner images formed by developing the electrostatic latent images by said first and second developing units,
wherein said optical scanning unit includes:
a first light source;
a second light source;
a rotatable polygonal mirror configured to reflect and deflect first laser light emitted from said first light source and second laser light emitted from said second light source, said rotatable polygonal mirror reflecting the second laser light in a direction opposite to a reflection direction of the first laser light;
a motor configured to rotationally drive said rotatable polygonal mirror;
a first mirror configured to reflect the first laser light deflected by said rotatable polygonal mirror and configured to guide the reflected first laser light to said first photosensitive member;
a second mirror configured to reflect the second laser light deflected by said rotatable polygonal mirror and configured to guide the reflected second laser light to said second photosensitive member;
a first lens configured to image the first laser light deflected by said rotatable polygonal mirror on said first photosensitive member;
a second lens configured to image the second laser light deflected by said rotatable polygonal mirror on said second photosensitive member; and
a casing accommodating said rotatable polygonal mirror, said motor, said first and second mirrors and said first and second lenses, wherein said casing includes an accommodating portion including a top wall on which said motor is mounted, a first side wall opposing one end portion of said first lens with respect to a longitudinal direction of said first lens, a second side wall opposing the other end portion of said first lens with respect to the longitudinal direction, and an opening, and includes a cover portion configured to cover said opening, of said accommodating portion, provided at a position opposing a motor mounting surface of said top wall,
wherein in a mounting range of said top wall of said accommodating portion in which said motor, said first and second mirrors and said first and second lenses are mounted with respect to a perpendicular direction perpendicular to both a rotational axis direction of said motor and the longitudinal direction of said first lens, at least one curved portion having a shape such that a part of said top wall projects so that said mounting surface approaches said opening is provided,
wherein with respect to the longitudinal direction of said first lens, said curved portion has a length equal to a gap between said first side wall and said second side wall,
wherein said top wall includes a recess on a surface opposite from said mounting surface at a portion corresponding to said curved portion,
wherein said cover includes a first portion through which the first laser light passes and a second portion through which the second laser light passes, and
wherein with respect to the rotational axis direction, a top end portion of said curved portion on an opening side of said casing, a reflecting surface of said rotatable polygonal mirror, and the first and second portions of said cover, are arranged in this order.

* * * * *